United States Patent [19]
Cheng

[11] Patent Number: 6,052,147
[45] Date of Patent: Apr. 18, 2000

[54] PHOTIC IMAGE PROCESSING DEVICE

[75] Inventor: Peen-Pau Cheng, Hsinchu, Taiwan

[73] Assignee: Mustek Systems, Inc., Hsinchu, Taiwan

[21] Appl. No.: 08/739,179

[22] Filed: Oct. 30, 1996

[51] Int. Cl.[7] ............................ H04N 5/235; H04N 5/228
[52] U.S. Cl. ........................................... 348/229; 348/222
[58] Field of Search ..................................... 348/257, 229, 348/230, 222, 223, 241, 272, 231, 207, 220, 372; 330/279, 282, 284

[56] References Cited

U.S. PATENT DOCUMENTS

| | | | |
|---|---|---|---|
| 4,959,727 | 9/1990 | Imaide et al. | 348/229 |
| 5,166,811 | 11/1992 | Nagano | 348/257 |
| 5,329,312 | 7/1994 | Boisvert et al. | 348/257 |
| 5,457,494 | 10/1995 | Suga et al. | 348/230 |
| 5,504,525 | 4/1996 | Suzuki | 348/223 |
| 5,554,975 | 9/1996 | Hall et al. | 340/573 |
| 5,625,412 | 4/1997 | Aciu et al. | 348/222 |
| 5,736,886 | 4/1998 | Mangelsdorf et al. | 348/241 |

Primary Examiner—Tuan Ho
Assistant Examiner—Luong Nguyen
Attorney, Agent, or Firm—Knobbe, Martens, Olson & Bear, LLP

[57] ABSTRACT

The present invention relates to a photic image processing device which includes a photic image pick-up circuit generating a photic image input signal having a plurality of basic image signals; a voltage regulating compensation circuit performing a first regulating compensation; a multiprogrammable gain amplifying circuit electrically connected to the voltage regulating compensation circuit, inputting the photic image input signal, performing a second regulating compensation for the basic image signals of the photic image input signal during a period of processing a specific photic image unit in accordance with a multiplex switching operation and outputting a series of photic image signals; an analog/digital converting circuit generating a digital photic image signal; and a memory interface control circuit electrically connected to the multiprogrammable gain amplifying circuit and generating a control signal. The economic photic image processing device disclosed in this disclosure is capable of processing a photic image in a manner of high quality and high resolution.

28 Claims, 2 Drawing Sheets

PHOTIC IMAGE PROCESSING DEVICE

FIELD OF THE INVENTION

The present invention relates to a photic image processing device, especially to a photic image device having high resolution and quality.

BACKGROUND OF THE INVENTION

In general, a photic image processing device at least includes three portions:

(1) a photic image pick-up component;
(2) a photic image processing component; and
(3) an electric power supplier and a motor driver.

As in the prior art, a programmable gain amplifier (PGA) disposed in the photic image processing component is employed for compensating a non-uniformity appearing among a lamp's brightness, a charge coupled device (CCD) and a lens.

However, the shortcoming of this compensation by utilizing a PGA is that, only one single color of the processed photic image is compensated at a time. Hence, if plural colors are required for processing, accordingly, plural PGAs are demanded. Consequently, the cost is increased and the electric circuit thereof is therefore becoming more complicated.

Besides, as disclosed in the prior art, plural exposure periods are utilized for compensating, however, each exposure period can merely process only one single color correspondingly. Hence, the processing time required for processing the photic image is accordingly increased.

In addition, when plural PGAs are employed for compensating the photic image, plural analog/digital amplifying devices are correspondingly required. Furthermore, owing to the high price of the analog/digital amplifying device, therefore, total cost of the photic image processing device is enormously increased.

SUMMARY OF THE INVENTION

The major object of the present invention is to provide an economic photic image processing device which is capable of processing a photic image in a manner of high quality and high resolution.

In accordance with an aspect of the present invention, a photic image processing device includes a photic image pick-up circuit generating a photic image input signal having a plurality of basic image signals, a voltage regulating compensation circuit performing a first regulating compensation, a multiprogrammable gain amplifying circuit electrically connected to the voltage regulating compensation circuit, inputting the photic image input signal, performing a second regulating compensation for the basic image signals of the photic image input signal during a period of processing a specific photic image unit in accordance with a multiplex switching operation and outputting a series of photic image signals, an analog/digital converting circuit generating a digital photic image signal and a memory interface control circuit electrically connected to the multiprogrammable gain amplifying circuit and generating a control signal.

In accordance with another aspect of the present invention, the photic image pick-up circuit generating a light signal to an object for obtaining a reflective signal, and executing a photoelectric conversion in response to the reflective signal for obtaining the photic image input signal having the plurality of basic image signals, includes a DC/AC voltage inverting circuit for converting a DC voltage signal into a AC voltage signal having a relatively higher frequency and a voltage, in response to an ON/OFF control signal, an illuminating unit electrically connected to the DC/AC voltage inverting circuit for generating and outputting the light signal in response to the AC voltage signal, a focusing device focusing and reflecting the reflective signal and a charge coupled device performing the photoelectric conversion for generating and outputting the photic image input signal in response to the control signal and the reflective signal reflected and focused via the focusing device.

In accordance with another aspect of the present invention, the illuminating unit is a lamp, and the focusing device includes mirrors and lens.

In accordance with another aspect of the present invention, the photic image pick-up circuit further includes a preamplifying device electrically connected to the charge coupled device, for executing a current amplification for the photic image input signal generated and outputted from the charge coupled device, in order to enhance an anti-disturbance ability of the photic image input signal.

In accordance with another aspect of the present invention, the voltage regulating compensation circuit electrically connected to the photic image pick-up circuit for inputting the photic image input signal, and performing the first regulating compensation in order to equilibrate the basic image signals of the photic image input signal, includes a correlated-double sampler electrically connected to the photic image pick-up circuit for eliminating a common-mode voltage of the photic image input signal, a voltage regulator electrically connected to the correlated-double sampler for regulating a DC voltage offset of the photic image input signal, a signal amplifier electrically connected to the voltage regulator for amplifying and outputting the photic image input signal whose the DC voltage offset is processed by the voltage regulator and an automatic gain controller electrically connected to the signal amplifier, for performing the first regulating compensation in response to the control signal, in order to equilibrate the basic image signals of the photic image input signal.

In accordance with another aspect of the present invention, the voltage regulator includes an adder.

In accordance with another aspect of the present invention, the basic image signals of the photic image input signal are respectively 3 series of photic image signals of red, green and blue fundamental colors.

In accordance with another aspect of the present invention, the first regulating compensation regulates and equilibrates the photic image signals of red, green and blue fundamental colors and compensates a lamp aging phenomenon of the photic image pick-up circuit.

In accordance with another aspect of the present invention, the multiprogrammable gain amplifying circuit includes a multiplexer electrically connected to the voltage regulating compensation circuit inputting the photic image input signal in response to the control signal, equally dividing the period of processing a specific photic image unit into three segments, and multiplexing the 3 series of the photic image signals of red, green and blue fundamental colors in each segment of the period to obtain a photic image output signal alternately containing therein the 3 series of photic image signals, a programmable gain compensator outputting respectively at the three segments respectively three compensation values for compensating the photic image signals of red, green and blue fundamental colors and a multiplier electrically connected to the multiplexer and the programmable gain compensator and compensating the photic image signals of red, green and blue fundamental colors by multiplying respectively the three compensation values therefor to accomplish the second compensation.

In accordance with another aspect of the present invention, the photic image pick-up circuit includes a lamp, a lens and a charge coupled device (CCD) and the second regulating compensation correlates and compensates a non-uniformity among the lamp's brightness, the lens and the charge coupled device (CCD).

In accordance with another aspect of the present invention, the memory interface control circuit includes a control signal operation generator electrically connected to the analog/digital converting circuit, generating and outputting the control signal corresponding to the digital photic image signal, and executing an operation for generating the photic image output signal, a system memory electrically connected to the control signal operation generator for recording and storing a correlating curve for the photic image signals of red, green and blue fundamental colors, a peripheral interface controller electrically connected to the control signal operation generator, for outputting the photic image output signal to a specific peripheral interface device in response to a peripheral interface control signal generated and outputted from the control signal operation generator, a microprocessor electrically connected to the control signal operation generator, for controlling an operation process beginning from picking up a photic image and ending with outputting the photic image output signal outputted from the peripheral interface controller and a programmable memory electrically connected to the microprocessor for providing a signal information required in the operation.

In accordance with another aspect of the present invention, the memory interface control circuit further includes a Gamma transforming device electrically connected to the control signal operation generator, and having a Gamma transforming table for a Gamma transformation in order that a user can define a color of the photic image by himself.

In accordance with another aspect of the present invention, the peripheral interface controller is a peripheral interface controller having a SCSI specification.

In accordance with another aspect of the present invention, the specific peripheral interface device is a personal computer.

In accordance with another aspect of the present invention, the analog/digital converting circuit electrically connected to the multiprogrammable gain amplifying circuit, for inputting and converting the series of photic image signals in order to output the digital photic image signal.

In accordance with another aspect of the present invention, the memory interface control circuit electrically connected to the photic image pick-up circuit, the voltage regulating compensation circuit, the multiprogrammable gain amplifying circuit and the analog/digital converting circuit, inputting and storing the digital photic image signal, and generating and outputting a photic image output signal via an operation, in which the memory interface control circuit generates the control signal in response to the digital photic image signal for respectively controlling the photic image pick-up circuit, the voltage regulating compensation circuit and the multiprogrammable gain amplifying circuit.

In accordance with another aspect of the present invention, further comprising an electric power driving circuit electrically connected to the voltage regulating compensation circuit, the multiprogrammable gain amplifying circuit, the analog/digital converting circuit and the memory interface control circuit, adapted to be electrically connected to a driving motor, providing a power signal for the photic image pick-up circuit, the voltage regulating compensation circuit, the memory interface control circuit, and generating a motor driving signal in order to drive the driving motor includes a power supplier providing the power signal and a motor driver electrically connected to the power supplier and the driving motor for generating the motor driving signal in order to drive the driving motor.

In accordance with another aspect of the present invention, the power supplier is a switch type power supplier.

The present invention may best be understood through the following description with reference to the accompanying drawings, in which:

DETAILED DESCRIPTION OF THE PREFERRED EMBODIMENT

Figure 1:
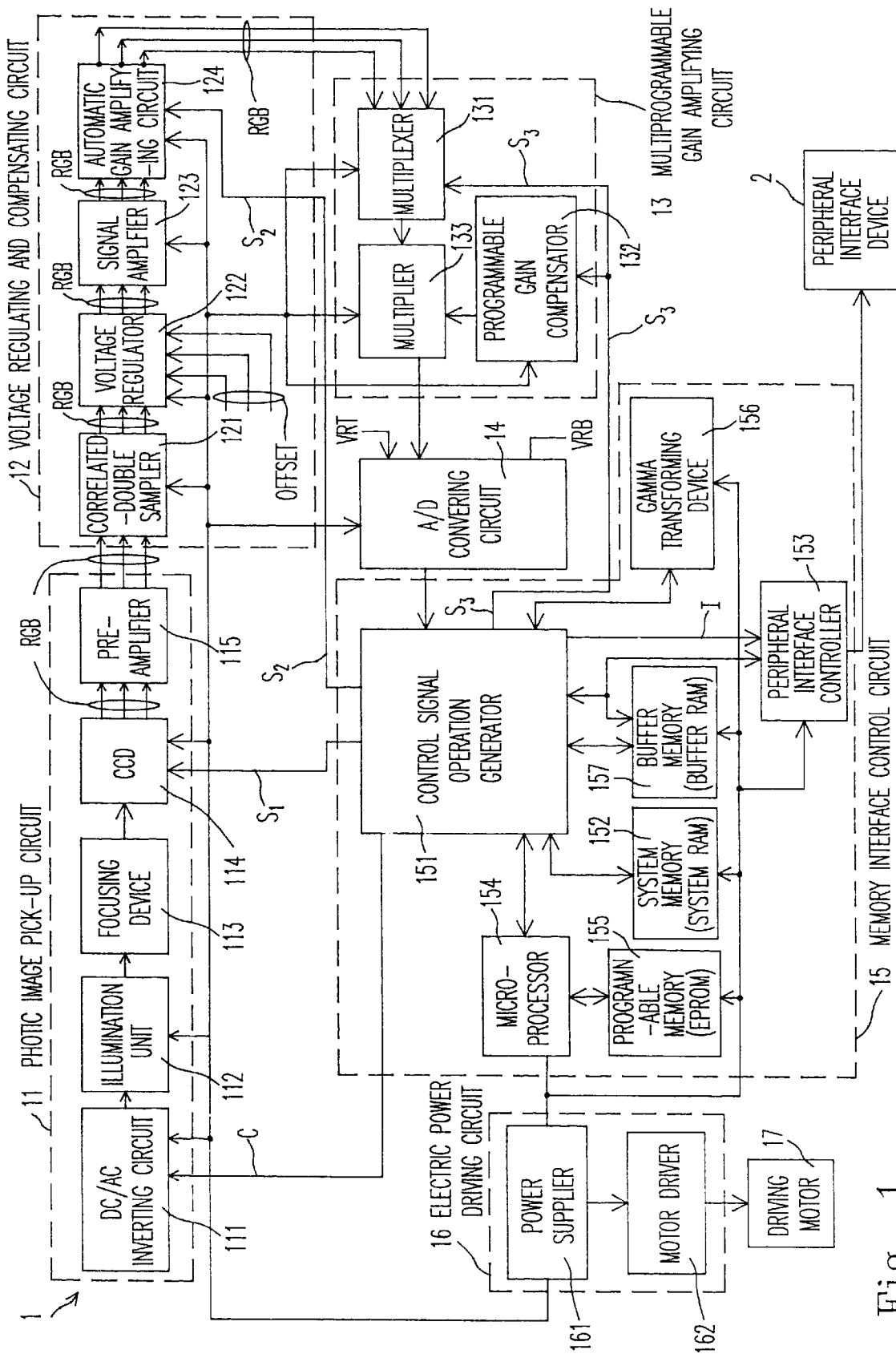
FIG. 1 is a system block diagram showing a preferred embodiment of an operation process according to the present invention.

Please refer to FIG. 1, which is a system block diagram showing a preferred embodiment of an operation process according to the present invention showing a photic image processing device 1 and a peripheral interface device 2. The photic image processing device 1 includes: a photic image pick-up circuit 11, a voltage regulating and compensating circuit 12, a multiprogrammable gain amplifying circuit 13, an analog/digital converting circuit 14, a memory interface control circuit 15, an electric power driving circuit 16 and a driving motor 17.

The photic image picking up circuit 11 further includes: a DC/AC voltage inverting circuit 111, an illumination unit 112 (preferably a lamp), a focusing device 113 (preferably a mirror and a lens), a charge coupled device (CCD) 114 and a preamplifying device 115.

The voltage regulating and compensating circuit 12 includes: a correlated-double sampler 121, a voltage regulator 122, a signal amplifier 123 and an automatic gain controller 124. The multiprogrammable gain amplifying circuit 13 includes: a multiplexer 131, a programmable gain compensator 132 and a multiplier 133.

The memory interface control circuit 15 includes: a control signal operation generator 151, a system memory (system RAM) 152, a peripheral interface controller 153, a microprocessor 154, a programmable memory (EPROM) 155, a Gamma transforming device 156 and a buffer memory (buffer RAM) 157. While the electric power driving circuit 16 includes: a power supplier 161 and a motor driver 162.

The operation process of the photic image processing device according to the present invention is described as follows:

At first, the DC/AC voltage inverting circuit 111 inverts a DC voltage signal into an AC voltage signal having a high frequency and a relatively higher voltage according to an ON/OFF control signal generated and outputted from the control signal operation generator 151, in order to control the illumination unit 112, and accordingly the illumination unit 112 is able to generate and project a light signal on an object, e.g. text or picture (not shown in FIG. 1) in response to the AC voltage signal, consequently, a reflective signal generated by the reflection of the text and/or the pictures, is further reflected to the focusing device 113, and therefore the focusing device 113 focuses and reflects the reflective signal thereon to the charge coupled device 114 for performing a photoelectric converting operation therefor in order to output a photic image input signal.

Wherein, the charge coupled device (CCD) generates a photic image input signal including the photic image signals of red, green and blue fundamental colors by employing a converting means of phase vs. voltage, in response respectively to a first control signal S1 generated by the control signal operation generator 151 and the focused reflective signal reflected from the focusing device 113. Thereafter, the photic image input signal is transmitted to the preamplifying device 115 from the charge coupled device 114, and the photic image input signal is processed by utilizing a current amplification in order to enhance an anti-disturbance ability of the photic image input signal. However, if the object irradiated by the illumination unit 112 is a transparent object, then merely a relevant equipment for handling the same is needed to equip the object for processing.

Moreover, the correlated-double sampler (CDS) 121 electrically connected to the preamplifying device 115, is used to reduce a common-mode voltage of the photic image input signal, thereafter, the DC voltage offset of the photic image input signal is eliminated by the voltage regulator 122 in which an adder can be included before amplified via the signal amplifier 123; wherein a differential value signal indicated by OFFSET in FIG. 1 cooperates with the voltage regulator 122 during the processing for regulating the DC offset of the photic image input signal.

An automatic gain controller 124 electrically connected to the signal amplifier 123 is used to regulate the equilibrium among the red (R), green (G) and blue (B) fundamental colors of the photic image input signal in response to a second control signal S2 generated and outputted from the control signal operation generator 151, in order to compensate the photic image aliasing caused by the aging phenomenon of the lamp 112.

Please now refer to the multiprogrammable gain amplifying circuit 13, in which the multiplexer 131 electrically connected to the voltage regulating and compensating circuit 12 is used to input the photic image input signal and divide a period of processing a specific photic image unit into three segments in response to a third control signal S3 generated and outputted from the control signal operation generator 151. The period of processing a specific photic image unit is the period for CCD 114 processing a pixel. The multiplexer 131 equally dividing the period of processing a specific photic image unit into three segments, and multiplexing the 3 series of the photic image signals of red, green and blue fundamental colors in each segment of the period to obtain a photic image output signal alternately containing therein the 3 series of photic image signals in order to compensate and correlate a non-uniformity among the brightness of the lamp 112, the lens 113 and the CCD 114. Furthermore, the programmable gain compensator 132 is able to output the compensation values respectively for the R, G and B fundamental colors during each of the three segments of the period for processing the photic image unit in accordance with the third control signal S3. Accordingly, the fundamental colors of R, G and B are respectively compensated by the compensation values and mixed up one another before outputted by a manner of in a series of photic image signals. Therefore, the compensated fundamental colors of R, G and B respectively outputted from these three segments are transmitted to the multiplier 133 and multiplied respectively to each other.

Thereafter, the outputted series of photic image signals are transmitted to the analog/digital converting circuit 14, accordingly the series of photic image signals are converted into a digital photic image signal therein in response to a VRT and a VBR signals.

The control signal operation generator 151 generates and outputs the first, second and third control signals S1, S2 and S3 according to the inputted digital photic image signal outputted from the analog/digital converting circuit 14, and the first, second and third control signals S1, S2 and S3 are utilized to execute an operation for generating a photic image output signal. The system memory 152 is used to record and store a correlating curve for the R, G and B fundamental colors. As to the peripheral interface controller 153, e.g. a SCSI peripheral interface controller, it is used to output the photic image output signal to a specified peripheral interface device 2, e.g. a personal computer, in response to a peripheral interface control signal I generated from the control signal operation generator 151. The microprocessor 154 is used to control a process operated in the photic image processing device 1 beginning from picking up a photic image and ending with outputting the photic image output signal via the peripheral interface controller 153. Moreover, the programmable memory 155 is employed to provide a required signal information for the microprocessor 154 during operation. The Gamma transforming device having a Gamma transforming table is used to perform a Gamma transformation in order that the user can define a color of a photic image by himself for achieving a demanded color. The buffer memory 157 provides the Gamma transforming device 156 with a storing function for storing a photic image information during the execution of the Gamma transformation, and outputs the photic image information outputted from the peripheral interface controller 153 to a specified peripheral interface device 2.

The power supplier 161, e.g. a switch type power supplier is used to provide a power source signal for the photic image device 1, and the motor driver 162 is utilized to drive the driving motor 17. Of course, if the power supplier 161 is able to be combined with the motor driver 162 into a single unit, the power loss induced by the circuit impedance will be accordingly reduced.

Figure 2:
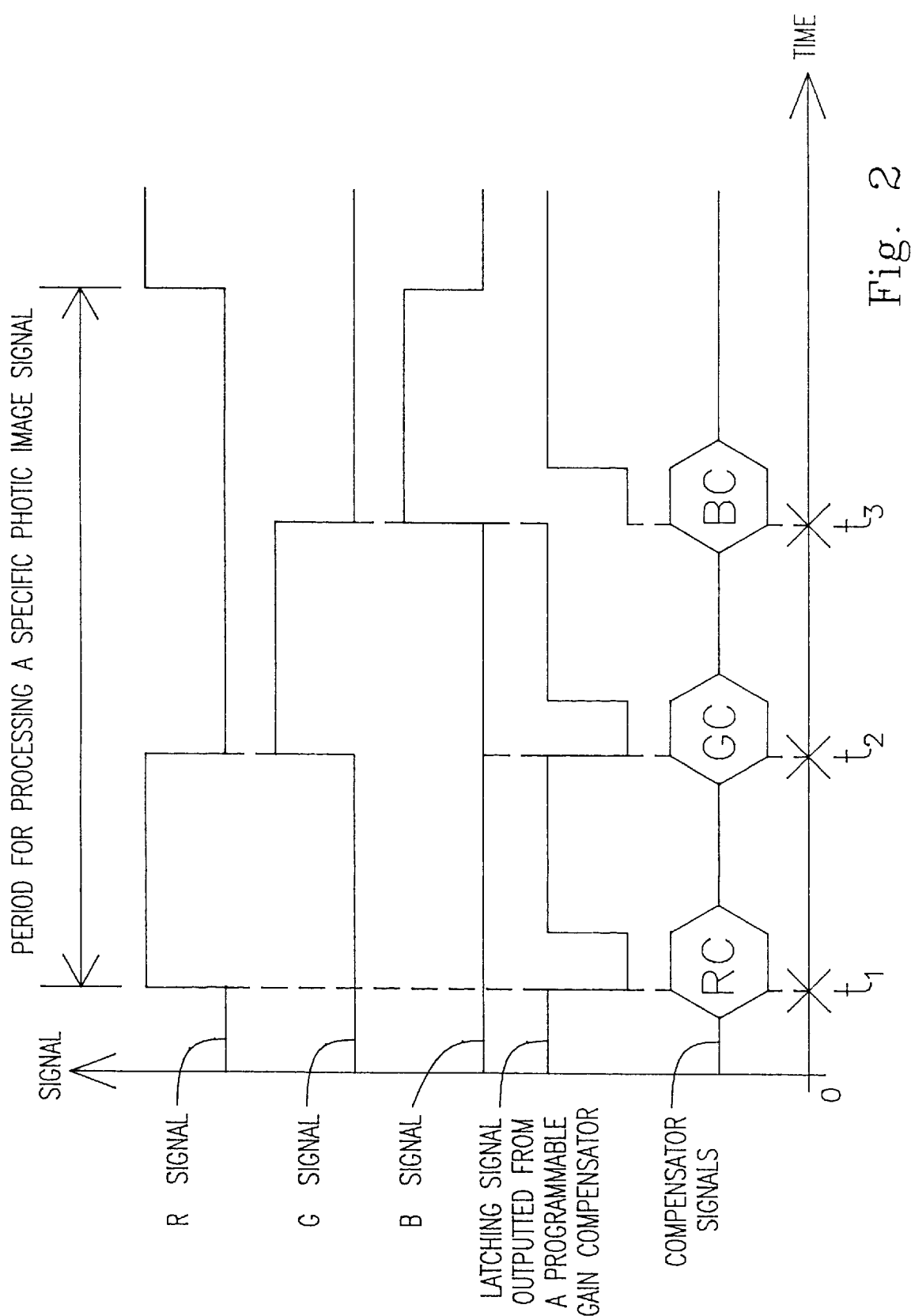
FIG. 2 is a time sequence diagram showing a preferred embodiment of an operation for processing and compensating the R, G and B fundamental colors of a photic image signal during a period of processing a specific photic image unit according to the present invention.

In order to further realize the compensating process for the R, G and B fundamental colors executed by the programmable gain compensator 132 of the multiprogrammable gain compensator 13, please refer to FIGS. 1 & 2. FIG. 2 is a time sequence diagram showing a preferred embodiment of an operation for processing and compensating the R, G and B fundamental colors in a period of processing a specific photic image unit according to the present invention. In FIG. 2, the multiplexer 131 outputting the R, G and B fundamental colors respectively in three distinct time segments of the period of processing the specific photic image unit by the multiswitching control in response to the third control signal S3. Accordingly, the programmable gain compensator 132 outputs respectively the latching signals and the compensation values RC, GC and BC for the R, G and B fundamental colors at the different time t1, t2 and t3 during compensation.

To sum up, the present invention merely needs a multiplexer 131, a control signal operation generator 151 for controlling the multiplexer 131 and an analog/digital converting circuit 14, to accomplish the same function obtained by utilizing plural multiplexers and plural analog/digital converting circuits as disclosed in the prior art. Hence, the circuit configuration disclosed in the present invention is capable of obtaining a photic image signal having a high resolution and quality but preventing from an evidently cost increment. Therefore, the present invention is a valuable industrial application.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A photo image processing device comprising:
   a photo image pick-up circuit generating a photic image signal having a plurality of basic image signals representing fundamental colors;
   a voltage regulating compensation circuit receiving said basic image signals, performing a first regulating compensation to each of said basic image signals of said photic image, and generating first compensated basic image signals; and
   a multiprogrammable gain amplifying circuit receiving said first compensated basic image signals in parallel from said voltage regulating compensation circuit; multiplexing said first compensated basic image signals in a period of time to generate a multiplexed photic image signal having said compensated basic image signals in series in said period of time, wherein said period is equal to a time of processing a photic image unit by said photo image pick-up circuit; performing a second regulating compensation for said multiplexed photic image signal, and outputting a second compensated multiplexed photic image signal.

2. A photic image processing device as claimed in claim 1, wherein said photic image pick-up circuit generating a light signal to an object for obtaining a reflective signal, and executing a photoelectric conversion in response to said reflective signal for obtaining said photic image input signal having said plurality of basic image signals, includes:
   a DC/AC voltage inverting circuit for converting a DC voltage signal into a AC voltage signal having a relatively higher frequency and a voltage, in response to an ON/OFF control signal;
   an illuminating unit electrically connected to said DC/AC voltage inverting circuit for generating and outputting said light signal in response to said AC voltage signal;
   a focusing device focusing and reflecting said reflective signal; and
   a charge coupled device performing said photoelectric conversion for generating and outputting said photic image input signal in response to said control signal and said reflective signal reflected and focused via said focusing device.

3. A photic image processing device as claimed in claim 2, wherein said illuminating unit is a lamp, and said focusing device includes mirrors and lens.

4. A photic image processing device as claimed in claim 2, wherein said photic image pick-up circuit further includes:
   a preamplifying device electrically connected to said charge coupled device, for executing a current amplification for said photic image input signal generated and outputted from said charge coupled device, in order to enhance an anti-disturbance ability of said photic image input signal.

5. A photic image processing device as claimed in claim 1, wherein said voltage regulating compensation circuit electrically connected to said photic image pick-up circuit for inputting said photic image input signal, and performing said first regulating compensation in order to equilibrate said basic image signals of said photic image input signal, includes:
   a correlated-double sampler electrically connected to said photic image pick-up circuit for eliminating a common-mode voltage of said photic image input signal;
   a voltage regulator electrically connected to said correlated-double sampler for regulating a DC voltage offset of said photic image input signal;
   a signal amplifier electrically connected to said voltage regulator for amplifying and outputting said photic image input signal whose said DC voltage offset is processed by said voltage regulator; and
   an automatic gain controller electrically connected to said signal amplifier, for performing said first regulating compensation in response to said control signal, in order to equilibrate said basic image signals of said photic image input signal.

6. A photic image processing device as claimed in claim 5, wherein said voltage regulator includes an adder.

7. A photic image processing device according to claim 1, further comprising:
   an analog/digital converting circuit generating a digital photic image signal; and
   a memory interface control circuit electrically connected to said multiprogrammable gain amplifying circuit and generating a control signal.

8. A photic image processing device as claimed in claim 1, said device further comprising:
   an analog/digital converting circuit converting said second compensated multiplexed photic image signal received from said multiprogrammable gain amplifying circuit to a digital photic image signal; and
   a memory interface control circuit generating a control signal for said multiprogrammable gain amplifying circuit.

9. A photic image processing device as claimed in claim 8, wherein said memory interface control circuit electrically connected to said photic image pick-up circuit, said voltage regulating compensation circuit, said multiprogrammable gain amplifying circuit and said analog/digital converting circuit, inputting and storing said digital photic image signal, and generating and outputting a photic image output signal via an operation, in which said memory interface control circuit generates said control signal in response to said digital photic image signal for respectively controlling said photic image pick-up circuit, said voltage regulating compensation circuit and said multiprogrammable gain amplifying circuit.

10. A photic image processing device as claimed in claim 8, further comprising an electric power driving circuit electrically connected to said voltage regulating compensation circuit, said multiprogrammable gain amplifying circuit, said analog/digital converting circuit and said memory interface control circuit, adapted to be electrically connected to a driving motor, providing a power signal for said photic image pick-up circuit, said voltage regulating compensation circuit, said memory interface control circuit, and generating a motor driving signal in order to drive said driving motor includes:
- a power supplier providing said power signal; and
- a motor driver electrically connected to said power supplier and said driving motor for generating said motor driving signal in order to drive said driving motor.

11. A photic image processing device as claimed in claim 10, wherein said power supplier is a switch type power supplier.

12. A photic image processing device as claimed in claim 8, wherein said basic image signals of said photic image signal are 3 basic signals indicative of red, green and blue fundamental colors.

13. A photic image processing device as claimed in claim 12, wherein said first regulating compensation regulates and equilibrates said photic image signals of red, green and blue fundamental colors and compensates a lamp aging phenomenon of said photic image pick-up circuit.

14. A photic image processing device as claimed in claim 12, wherein said multiprogrammable gain amplifying circuit includes:
- a multiplexer electrically connected to said voltage regulating compensation circuit, inputting said first compensated basic image signals in response to said control signal, equally dividing said period of time into three segments, and multiplexing said 3 basic signals of red, green, and blue fundamental colors in said three segments to obtain a multiplexed photic image signal alternately containing therein said 3 basic signals;
- a programmable gain compensator outputting at said three segments three compensation values, each of said three compensation value compensating one of said basic signals of red, green and blue fundamental colors at the corresponding segment in said multiplexed photic image signal; and
- a multiplier electrically connected to said multiplexer and said programmable gain compensator and compensating said 3 basic signals of red, green and blue fundamental colors in said multiplexed photic image signal by multiplying respectively said three compensation values therefor to accomplish said second compensation.

15. A photic image processing device as claimed in claim 12, wherein said photic image pick-up circuit includes a lamp having a brightness, a lens and a charge coupled device (CCD) and said second regulating compensation correlates and compensates a non-uniformity among said lamp's brightness, said lens and said charge coupled device (CCD).

16. A photic image processing device as claimed in claim 12, wherein said memory interface control circuit includes:
- a control signal operation generator electrically connected to said analog/digital converting circuit, generating and outputting said control signal corresponding to said digital photic image signal, and executing an operation for generating said photic image output signal;
- a system memory electrically connected to said control signal operation generator for recording and storing a correlating curve for said photic image signals of red, green and blue fundamental colors;
- a peripheral interface controller electrically connected to said control signal operation generator, for outputting said photic image output signal to a specific peripheral interface device in response to a peripheral interface control signal generated and outputted from said control signal operation generator;
- a microprocessor electrically connected to said control signal operation generator, for controlling an operation process beginning from picking up a photic image and ending with outputting said photic image output signal outputted from said peripheral interface controller; and
- a programmable memory electrically connected to said microprocessor for providing a signal information required in said operation.

17. A photic image processing device as claimed in claim 16, wherein said memory interface control circuit further includes:
- a Gamma transforming device electrically connected to said control signal operation generator, and having a Gamma transforming table for a Gamma transformation in order that a user can define a color of said photic image by himself.

18. A photic image processing device as claimed in claim 16, wherein said peripheral interface controller is a peripheral interface controller having a SCSI specification.

19. A photic image processing device as claimed in claim 16, wherein said specific peripheral interface device is a personal computer.

20. A photic image processing device comprising:
- a photic image pick-up circuit generating a photic image input signal having a plurality of basic image signals;
- a voltage regulating compensation circuit performing a first regulating compensation;
- a multiprogrammable gain amplifying circuit electrically connected to said voltage regulating compensation circuit, inputting said photic image input signal, performing a second regulating compensation for said basic image signals of said photic image input signal during a period of processing a photic image unit in accordance with a multiplex switching operation and outputting a photic image signals;
- an analog/digital converting circuit generating a digital photic image signal; and
- a memory interface control circuit electrically connected to said multiprogrammable gain amplifying circuit and generating a control signal, wherein said voltage regulating compensation circuit is electrically connected to said photic image pick-up circuit for inputting said photic image input signal and performing said first regulating compensation in order to equilibrate said basic image signals of said photic image input signal, and said voltage regulating compensation circuit includes:
  - a correlated-double sampler electrically connected to said photic image pick-up circuit for eliminating a common-mode voltage of said photic image input signal;
  - a voltage regulator electrically connected to said correlated-double sampler for regulating a DC voltage offset of said photic image input signal;
  - a signal amplifier electrically connected to said voltage regulator for amplifying and outputting said photic image input signal whose said DC voltage offset is processed by said voltage regulator; and
  - an automatic gain controller electrically connected to said signal amplifier for performing said first regulating compensation in response to said control signal, in order to equilibrate said basic image signals of said photic image input signal.

21. A photic image processing device as claimed in claim 20, wherein said voltage regulator includes an adder.

22. A photic image processing device comprising:
- a photic image pick-up circuit generating a photic image input signal having a plurality of basic image signals;
- a voltage regulating compensation circuit performing a first regulating compensation;
- a multiprogrammable gain amplifying circuit electrically connected to said voltage regulating compensation circuit, inputting said photic image input signal, performing a second regulating compensation for said basic image signals of said photic image input signal during a period of processing a photic image unit in accordance with a multiplex switching operation and outputting a photic image signals;
- an analog/digital converting circuit generating a digital photic image signal; and
- a memory interface control circuit electrically connected to said multiprogrammable gain amplifying circuit and generating a control signal;
- wherein said basic image signals of said photic image input signal are respectively 3 series of photic image signals of red, green and blue fundamental colors, and wherein said first regulating compensation regulates an equilibrates said photic image signals of red, green and blue fundamental colors and compensates a lamp aging phenomenon of said photic image pick-up circuit.

23. A photic image processing device as claimed in claim 22, wherein said multiprogrammable gain amplifying circuit includes:
- a multiplexer electrically connected to said voltage regulating compensation circuit inputting said photic image input signal in response to said control signal, equally dividing said period of processing a specific photic image unit into three segments, and multiplexing said 3 series of said photic image signals of red, green and blue fundamental colors in different said segments to obtain a photic image output signal alternately containing therein said 3 series of photic image signals;
- a programmable gain compensator outputting respectively at said three segments respectively three a plurality of compensation values for compensating said photic image signals of red, green and blue fundamental colors; and
- a multiplier electrically connected to said multiplexer and said programmable gain compensator and compensating said photic image signals of red, green and blue fundamental colors by respectively said three compensation values therefor to accomplish said second compensation.

24. A photic image processing device as claimed in claim 22, wherein said photic image pick-up circuit includes a lamp having a brightness, a lens and a charge coupled device (CCD), and said second regulating compensation correlates and compensates a non-uniformity among said lamp's brightness, said lens and said charge coupled device (CCD).

25. A photic image processing device as claimed in claim 22, wherein said memory interface control circuit includes:
- a control signal operation generator electrically connected to said analog/digital converting circuit, generating and outputting said control signals according to said digital photic image signal, and executing an operation for generating said photic image output signal;
- a system memory electrically connected to said control signal operation generator for recording and storing a correlating curve for said photic image signals of red, green and blue fundamental colors;
- a peripheral interface controller electrically connected to said control signal operation generator, for outputting said photic image output signal to a specific peripheral interface device in response to a peripheral interface control signal generated and outputted from said control signal operation generator;
- a microprocessor electrically connected to said control signal operation generator, for controlling an operation process beginning from picking up a photic image and ending with outputting said photic image output signal outputted from said peripheral interface controller; and
- a programmable memory electrically connected to said microprocessor for providing a signal information required in said operation.

26. A photic image processing device as claimed in claim 24, wherein said memory interface control circuit further includes:
- a Gamma transforming device electrically connected to said control signal operation generator, and having a Gamma transforming table for a Gamma transformation in order that a user can define a color of said photic image by himself.

27. A photic image processing device as claimed in claim 24, wherein said peripheral interface controller is a peripheral interface controller having a SCSI specification.

28. A photic image processing device as claimed in claim 24, wherein said specific peripheral interface device is a personal computer.

* * * * *